(12) United States Patent
Heron et al.

(10) Patent No.: US 8,701,196 B2
(45) Date of Patent: Apr. 15, 2014

(54) SYSTEM, METHOD AND COMPUTER PROGRAM PRODUCT FOR OBTAINING A REPUTATION ASSOCIATED WITH A FILE

(75) Inventors: George L. Heron, Forest Hill, MD (US); Christopher S. Bolin, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 902 days.

(21) Appl. No.: 11/395,758

(22) Filed: Mar. 31, 2006

(65) Prior Publication Data

US 2013/0247129 A1 Sep. 19, 2013

(51) Int. Cl.
*G06F 11/00* (2006.01)

(52) U.S. Cl.
USPC ............... 726/25; 726/22; 726/23; 726/24

(58) Field of Classification Search
USPC .................................. 726/25, 22, 23, 24
See application file for complete search history.

(56) References Cited

U.S. PATENT DOCUMENTS

| | | | |
|---|---|---|---|
| 5,274,819 A | 12/1993 | Blomfield-Brown | 718/100 |
| 5,742,763 A | 4/1998 | Jones | 719/317 |
| 5,870,559 A | 2/1999 | Leshem et al. | |
| 5,892,904 A | 4/1999 | Atkinson et al. | |
| 5,949,419 A | 9/1999 | Domine et al. | |
| 5,978,917 A * | 11/1999 | Chi | 726/22 |
| 5,987,610 A | 11/1999 | Franczek et al. | |
| 6,018,724 A | 1/2000 | Arent | 705/44 |
| 6,065,055 A | 5/2000 | Hughes et al. | 709/229 |
| 6,073,142 A | 6/2000 | Geiger et al. | |
| 6,219,786 B1 | 4/2001 | Cunningham et al. | |
| 6,285,999 B1 | 9/2001 | Page | 707/5 |
| 6,321,334 B1 | 11/2001 | Jerger et al. | |
| 6,356,937 B1 | 3/2002 | Montville et al. | 709/206 |
| 6,366,912 B1 | 4/2002 | Wallent et al. | 707/9 |
| 6,367,012 B1 | 4/2002 | Atkinson et al. | |
| 6,460,050 B1 | 10/2002 | Pace et al. | |
| 6,539,430 B1 | 3/2003 | Humes | 709/225 |
| 6,606,659 B1 | 8/2003 | Hegli et al. | 709/225 |
| 6,647,400 B1 | 11/2003 | Moran | |
| 6,658,394 B1 | 12/2003 | Khaishgi et al. | |
| 6,708,205 B2 | 3/2004 | Sheldon et al. | |
| 6,742,128 B1 | 5/2004 | Joiner | 726/25 |
| 6,748,422 B2 | 6/2004 | Morin et al. | |
| 6,772,345 B1 | 8/2004 | Shetty | |
| 6,785,732 B1 | 8/2004 | Bates et al. | 709/232 |
| 6,826,697 B1 | 11/2004 | Moran | |
| 6,856,963 B1 | 2/2005 | Hurwitz | 705/10 |

(Continued)

FOREIGN PATENT DOCUMENTS

| | | |
|---|---|---|
| WO | WO 99/49380 | 9/1999 |
| WO | WO 01/55873 | 8/2001 |

(Continued)

OTHER PUBLICATIONS

Siteadvisor, http://www.siteadvisor.com/.

(Continued)

*Primary Examiner* — Teshome Hailu
(74) *Attorney, Agent, or Firm* — Patent Capital Group

(57) ABSTRACT

A reputation system, method and computer program product are provided. In use, a file associated with a first computer is identified. Thereafter, a reputation associated with the file stored at a second computer is obtained.

25 Claims, 6 Drawing Sheets

(56) References Cited

U.S. PATENT DOCUMENTS

| | | |
|---|---|---|
| 6,886,102 B1 | 4/2005 | Lyle |
| 6,907,533 B2 | 6/2005 | Sorkin et al. |
| 6,938,003 B2 | 8/2005 | Harpale |
| 7,003,734 B1 | 2/2006 | Gardner et al. ............... 715/808 |
| 7,024,630 B2 | 4/2006 | Himmel et al. ............... 715/747 |
| 7,084,760 B2 | 8/2006 | Himberger et al. ............ 340/540 |
| 7,096,493 B1 * | 8/2006 | Liu ..................................... 726/8 |
| 7,100,122 B2 | 8/2006 | Blaschke et al. ................ 715/808 |
| 7,114,177 B2 | 9/2006 | Rosenberg et al. ................ 726/4 |
| 7,136,875 B2 | 11/2006 | Anderson et al. |
| 7,143,139 B2 | 11/2006 | Burbeck et al. ............... 709/206 |
| 7,171,470 B2 | 1/2007 | Doyle et al. |
| 7,207,480 B1 | 4/2007 | Geddes ........................ 235/380 |
| 7,216,360 B2 * | 5/2007 | Nakao et al. ..................... 726/7 |
| 7,231,395 B2 | 6/2007 | Fain et al. ..................... 707/101 |
| 7,254,573 B2 | 8/2007 | Burke |
| 7,257,549 B2 | 8/2007 | Karaoguz et al. ............... 705/26 |
| 7,313,691 B2 | 12/2007 | Bantz et al. ................... 713/155 |
| 7,370,188 B2 | 5/2008 | Rothman et al. ................. 713/2 |
| 7,380,267 B2 * | 5/2008 | Arai et al. ......................... 726/1 |
| 7,506,155 B1 | 3/2009 | Stewart et al. |
| 7,562,304 B2 | 7/2009 | Dixon et al. ................... 715/738 |
| 7,603,718 B2 | 10/2009 | Rounthwaite et al. |
| 7,634,810 B2 | 12/2009 | Goodman et al. |
| 7,694,135 B2 | 4/2010 | Rowan et al. |
| 7,756,930 B2 | 7/2010 | Brahms et al. |
| 7,765,481 B2 | 7/2010 | Dixon et al. |
| 7,809,650 B2 | 10/2010 | Bruesewitz et al. |
| 7,822,620 B2 | 10/2010 | Dixon et al. |
| 7,831,611 B2 | 11/2010 | Roberts et al. |
| 7,831,915 B2 | 11/2010 | Averbuch et al. |
| 8,065,720 B1 | 11/2011 | Ebrahimi et al. |
| 8,296,664 B2 | 10/2012 | Dixon et al. |
| 8,321,791 B2 | 11/2012 | Dixon et al. |
| 8,429,545 B2 | 4/2013 | Dixon et al. |
| 8,438,499 B2 | 5/2013 | Dixon et al. |
| 2001/0007098 A1 | 7/2001 | Hinrichs et al. ................ 705/14 |
| 2001/0011284 A1 | 8/2001 | Humpleman et al. ......... 707/511 |
| 2001/0014164 A1 | 8/2001 | Daniels et al. ................. 382/101 |
| 2001/0027450 A1 | 10/2001 | Shinoda et al. |
| 2001/0029532 A1 | 10/2001 | Kato et al. .................... 709/223 |
| 2001/0042931 A1 | 11/2001 | Anderson et al. |
| 2001/0044744 A1 | 11/2001 | Rhoads .......................... 705/14 |
| 2001/0044809 A1 | 11/2001 | Parasnis et al. ................ 707/513 |
| 2001/0044901 A1 | 11/2001 | Grawrock |
| 2001/0054152 A1 * | 12/2001 | Nakao et al. .................. 713/182 |
| 2001/0056550 A1 * | 12/2001 | Lee ................................ 713/201 |
| 2002/0012443 A1 | 1/2002 | Rhoads et al. ................. 382/100 |
| 2002/0019831 A1 | 2/2002 | Wade |
| 2002/0046041 A1 | 4/2002 | Lang |
| 2002/0052934 A1 | 5/2002 | Doherty |
| 2002/0059364 A1 | 5/2002 | Coulthard et al. ............. 709/203 |
| 2002/0069129 A1 | 6/2002 | Akutsu et al. .................. 705/26 |
| 2002/0103801 A1 | 8/2002 | Lyons |
| 2002/0138402 A1 | 9/2002 | Zacharia et al. ............... 705/37 |
| 2002/0143885 A1 | 10/2002 | Ross .............................. 709/207 |
| 2002/0178381 A1 | 11/2002 | Lee et al. ...................... 713/201 |
| 2002/0180778 A1 | 12/2002 | Proudler ........................ 345/734 |
| 2002/0194483 A1 | 12/2002 | Wenocur et al. .............. 713/185 |
| 2002/0198950 A1 | 12/2002 | Leeds |
| 2002/0199120 A1 | 12/2002 | Schmidt |
| 2003/0018585 A1 | 1/2003 | Butler et al. ................... 705/53 |
| 2003/0023878 A1 | 1/2003 | Rosenberg et al. ............ 713/201 |
| 2003/0055737 A1 | 3/2003 | Pope et al. ..................... 705/26 |
| 2003/0055962 A1 | 3/2003 | Freund et al. |
| 2003/0088577 A1 | 5/2003 | Thurnhofer et al. |
| 2003/0097591 A1 | 5/2003 | Pham et al. .................... 713/201 |
| 2003/0158888 A1 | 8/2003 | Bjorklund et al. |
| 2003/0172166 A1 | 9/2003 | Judge et al. .................... 709/229 |
| 2003/0182421 A1 | 9/2003 | Faybishenko et al. ........ 709/224 |
| 2003/0220912 A1 | 11/2003 | Fain et al. |
| 2004/0006532 A1 | 1/2004 | Lawrence et al. |
| 2004/0059705 A1 | 3/2004 | Wittke et al. |
| 2004/0088369 A1 | 5/2004 | Yeager et al. |
| 2004/0093506 A1 | 5/2004 | Grawrock et al. |
| 2004/0107363 A1 | 6/2004 | Monteverde ................... 713/201 |
| 2004/0122926 A1 | 6/2004 | Moore et al. ................... 709/223 |
| 2004/0123117 A1 | 6/2004 | Berger |
| 2004/0123157 A1 | 6/2004 | Alagna et al. |
| 2004/0143753 A1 | 7/2004 | Hernacki et al. |
| 2004/0148281 A1 | 7/2004 | Bates et al. |
| 2004/0153414 A1 | 8/2004 | Khaishgi et al. ................ 705/58 |
| 2004/0153512 A1 | 8/2004 | Friend |
| 2004/0167980 A1 | 8/2004 | Doyle et al. .................... 709/225 |
| 2004/0168121 A1 | 8/2004 | Matz |
| 2004/0169678 A1 | 9/2004 | Oliver ............................. 345/738 |
| 2004/0199606 A1 | 10/2004 | Brown et al. ................... 709/219 |
| 2004/0205173 A1 | 10/2004 | Hall |
| 2004/0205354 A1 | 10/2004 | Gabriel et al. |
| 2004/0210602 A1 | 10/2004 | Hillis et al. ..................... 707/104.1 |
| 2004/0250115 A1 | 12/2004 | Gemmel et al. |
| 2005/0005111 A1 | 1/2005 | Brebner et al. |
| 2005/0015506 A1 | 1/2005 | Padborg ......................... 709/229 |
| 2005/0022018 A1 | 1/2005 | Szor |
| 2005/0033991 A1 | 2/2005 | Crane ............................. 713/201 |
| 2005/0044423 A1 | 2/2005 | Mellmer et al. ................ 713/201 |
| 2005/0052998 A1 | 3/2005 | Oliver et al. |
| 2005/0071684 A1 | 3/2005 | Sorkin et al. |
| 2005/0076222 A1 | 4/2005 | Olkin et al. ..................... 713/176 |
| 2005/0091514 A1 | 4/2005 | Fukumoto et al. |
| 2005/0114709 A1 | 5/2005 | Moore et al. |
| 2005/0165680 A1 | 7/2005 | Keeling et al. ................. 705/40 |
| 2005/0216300 A1 | 9/2005 | Appelman et al. ............. 705/1 |
| 2005/0216454 A1 | 9/2005 | Diab et al. |
| 2005/0235343 A1 | 10/2005 | Stephens |
| 2005/0240576 A1 | 10/2005 | Piscitello et al. |
| 2005/0251756 A1 | 11/2005 | Tamaki |
| 2005/0256866 A1 | 11/2005 | Lu et al. |
| 2006/0004713 A1 | 1/2006 | Korte et al. |
| 2006/0009994 A1 | 1/2006 | Hogg et al. ..................... 705/1 |
| 2006/0015722 A1 | 1/2006 | Rowan et al. .................. 713/166 |
| 2006/0041508 A1 | 2/2006 | Pham et al. |
| 2006/0069618 A1 | 3/2006 | Milener et al. |
| 2006/0095404 A1 | 5/2006 | Adelman et al. ............... 707/3 |
| 2006/0095586 A1 | 5/2006 | Adelman et al. ............... 709/245 |
| 2006/0106866 A1 | 5/2006 | Green et al. |
| 2006/0106914 A1 | 5/2006 | Plow et al. |
| 2006/0117389 A1 | 6/2006 | Pool ................................ 726/27 |
| 2006/0123478 A1 | 6/2006 | Rehfuss et al. |
| 2006/0174343 A1 | 8/2006 | Duthie et al. ................... 726/23 |
| 2006/0179157 A1 | 8/2006 | Huang |
| 2006/0212925 A1 | 9/2006 | Shull et al. ..................... 726/1 |
| 2006/0218403 A1 | 9/2006 | Sauve et al. |
| 2006/0235796 A1 | 10/2006 | Johnson et al. ................. 705/44 |
| 2006/0239430 A1 | 10/2006 | Gue et al. ....................... 379/201.05 |
| 2006/0242026 A1 | 10/2006 | Crespo et al. ................... 705/26 |
| 2006/0253458 A1 | 11/2006 | Dixon et al. |
| 2006/0253578 A1 | 11/2006 | Dixon et al. |
| 2006/0253579 A1 | 11/2006 | Dixon et al. |
| 2006/0253580 A1 | 11/2006 | Dixon et al. |
| 2006/0253581 A1 | 11/2006 | Dixon et al. |
| 2006/0253582 A1 | 11/2006 | Dixon et al. |
| 2006/0253583 A1 | 11/2006 | Dixon et al. |
| 2006/0253584 A1 | 11/2006 | Dixon et al. |
| 2006/0265417 A1 | 11/2006 | Amato et al. ................... 707/102 |
| 2006/0282795 A1 | 12/2006 | Clark et al. ..................... 715/840 |
| 2007/0028291 A1 * | 2/2007 | Brennan et al. ................ 726/1 |
| 2007/0028304 A1 * | 2/2007 | Brennan ......................... 726/24 |
| 2007/0039038 A1 | 2/2007 | Goodman et al. .............. 726/2 |
| 2007/0074125 A1 | 3/2007 | Platt et al. |
| 2007/0083929 A1 | 4/2007 | Sprosts et al. |
| 2007/0088652 A1 | 4/2007 | Firmage et al. ................ 705/37 |
| 2007/0118898 A1 | 5/2007 | Morgan et al. |
| 2007/0130350 A1 | 6/2007 | Alperovitch et al. .......... 709/229 |
| 2007/0203884 A1 * | 8/2007 | Nichols et al. ................. 707/2 |
| 2008/0028029 A1 | 1/2008 | Hart ................................ 709/206 |
| 2008/0109473 A1 | 5/2008 | Dixon et al. |
| 2008/0114709 A1 | 5/2008 | Dixon et al. |
| 2008/0134084 A1 | 6/2008 | Clark et al. ..................... 715/808 |
| 2008/0162225 A1 | 7/2008 | Malcolm |
| 2008/0250159 A1 | 10/2008 | Wang et al. ..................... 709/239 |
| 2009/0089287 A1 | 4/2009 | Roberts et al. |
| 2009/0258253 A1 | 10/2009 | Hinoue et al. |
| 2009/0281905 A1 | 11/2009 | Walton ............................ 705/26 |

(56) References Cited

U.S. PATENT DOCUMENTS

| | | | |
|---|---|---|---|
| 2010/0042931 A1 | 2/2010 | Dixon et al. | |
| 2012/0185942 A1 | 7/2012 | Dixon et al. | |
| 2012/0311705 A1 | 12/2012 | Dixon et al. | |
| 2013/0014020 A1 | 1/2013 | Dixon et al. | |

FOREIGN PATENT DOCUMENTS

| | | |
|---|---|---|
| WO | WO 01/55905 | 8/2001 |
| WO | WO 03/049403 | 6/2003 |
| WO | WO 03/079214 | 9/2003 |
| WO | WO 2004/061703 | 7/2004 |
| WO | WO 2005/010649 | 2/2005 |
| WO | WO 2005/033978 | 4/2005 |
| WO | WO 2005/043351 | 5/2005 |
| WO | WO 2005/043416 | 5/2005 |
| WO | WO 2005/043417 | 5/2005 |
| WO | WO 2006/020095 | 2/2006 |

OTHER PUBLICATIONS

Office Action Summary from U.S. Appl. No. 11/905,330 mailed on Dec. 30, 2009.
Final Office Action Summary from U.S. Appl. No. 11/342,319 mailed on Jan. 22, 2010.
Office Action Summary from U.S. Appl. No. 11/342,250 mailed on Feb. 26, 2010.
Final Office Action Summary from U.S. Appl. No. 11/342,322 mailed on Mar. 1, 2010.
Final Office Action Summary from U.S. Appl. No. 11/837,067 mailed on Mar. 1, 2010.
Office Action Summary from U.S. Appl. No. 11/837,050 mailed on Sep. 2, 2009.
Final Office Action Summary from U.S. Appl. No. 11/342,318 mailed on Sep. 21, 2009.
Office Action Summary from U.S. Appl. No. 11/342,322 mailed on Oct. 16, 2009.
Office Action Summary from U.S. Appl. No. 11/342,297 mailed on Dec. 28, 2009.
Office Action Summary from U.S. Appl. No. 11/342,342 mailed on Jan. 12, 2010.
Office Action Summary from U.S. Appl. No. 11/342,343 mailed on Jan. 13, 2010.
Final Office Action Summary from U.S. Appl. No. 11/342,250 mailed on Dec. 2, 2009.
U.S. Appl. No. 60/588,570, filed Jul. 16, 2004.
U.S. Appl. No. 60/633,464, filed Dec. 6, 2004.
"Advertisement," Dictionary.com, http://dictionary.reference.com/browse/advertisement, Feb. 11, 2010.
Notice of Allowance from U.S. Appl. No. 11/905,330 mailed on Apr. 30, 2010.
Final Office Action Summary from U.S. Appl. No. 11/837,050 mailed on Apr. 7, 2010.
U.S. Appl. No. 11/281,963, filed Nov. 16, 2005.
Non-Final Office Action Summary from U.S. Appl. No. 11/281,963 mailed on Nov. 13, 2007.
Non-Final Office Action Summary from U.S. Appl. No. 11/281,963 mailed on Dec. 2, 2008.
Final Office Action Summary from U.S. Appl. No. 11/281,963 mailed on Jun. 10, 2008.
Non-Final Office Action Summary from U.S. Appl. No. 11/281,963 mailed on Jun. 2, 2009.
Office Action Summary from U.S. Appl. No. 11/281,963 mailed on Mar. 8, 2010.
U.S. Appl. No. 11/852,948, filed Sep. 10, 2007.
Non-Final Office Action Summary from U.S. Appl. No. 11/852,948 mailed on Oct. 7, 2009.
Non-Final Office Action Summary from U.S. Appl. No. 11/342,297 mailed on Jul. 9, 2008.
Final Office Action Summary from U.S. Appl. No. 11/342,297 mailed on Mar. 17, 2009.
Notice of Allowance from U.S. Appl. No. 11/342,297 mailed on May 26, 2010.
Non-Final Office Action Summary from U.S. Appl. No. 11/342,319 mailed on Sep. 17, 2008.
Final Office Action Summary from U.S. Appl. No. 11/342,319 mailed on Mar. 16, 2009.
Non-Final Office Action Summary from U.S. Appl. No. 11/342,319 mailed on Aug. 25, 2009.
Advisory Action Summary from U.S. Appl. No. 11/342,319 mailed on Apr. 21, 2010.
Final Office Action Summary from U.S. Appl. No. 11/342,250 mailed on Dec. 16, 2008.
Advisory Action Summary from U.S. Appl. No. 11/342,250 mailed on Feb. 25, 2009.
Non-Final Office Action Summary from U.S. Appl. No. 11/342,250 mailed on May 28, 2009.
Non-Final Office Action Summary from U.S. Appl. No. 11/342,250 mailed on Jun. 20, 2008.
Final Office Action Summary from U.S. Appl. No. 11/342,343 mailed on Jul. 14, 2010.
Final Office Action Summary from U.S. Appl. No. 11/342,318 mailed on Aug. 18, 2008.
Non-Final Office Action Summary from U.S. Appl. No. 11/342,318 mailed on Mar. 26, 2009.
Non-Final Office Action Summary from U.S. Appl. No. 11/342,318 mailed on Mar. 27, 2008.
Non-Final Office Action Summary from U.S. Appl. No. 11/342,342 mailed on Jan. 23, 2009.
Non-Final Office Action Summary from U.S. Appl. No. 11/342,342 mailed on Jan. 24, 2008.
Advisory Action Summary from U.S. Appl. No. 11/342,342 mailed on Nov. 12, 2008.
Final Office Action Summary from U.S. Appl. No. 11/342,342 mailed on Jul. 22, 2008.
Final Office Action Summary from U.S. Appl. No. 11/342,342 mailed on Aug. 20, 2009.
Non-Final Office Action Summary from U.S. Appl. No. 11/342,320 mailed on May 5, 2008.
Final Office Action Summary from U.S. Appl. No. 11/342,320 mailed on Dec. 11, 2008.
Notice of Allowance from U.S. Appl. No. 11/342,320 mailed on Mar. 4, 2009.
Notice of Allowability from U.S. Appl. No. 11/342,320 mailed on Apr. 27, 2009.
Non-Final Office Action Summary from U.S. Appl. No. 11/342,322 mailed on Sep. 18, 2008.
Final Office Action Summary from U.S. Appl. No. 11/342,322 mailed on May 15, 2009.
Advisory Action Summary from U.S. Appl. No. 11/342,322 mailed on Aug. 10, 2009.
Non-Final Office Action Summary from U.S. Appl. No. 11/837,067 mailed on Jun. 12, 2009.
Final Office Action Summary from U.S. Appl. No. 11/837,067 mailed on Dec. 31, 2008.
Non-Final Office Action Summary from U.S. Appl. No. 11/837,067 mailed on Jul. 12, 2010.
Non-Final Office Action Summary from U.S. Appl. No. 11/837,067 mailed on Jun. 17, 2008.
U.S. Appl. No. 11/342,250, filed Jan. 26, 2006.
U.S. Appl. No. 11/837,050, filed Aug. 10, 2007.
U.S. Appl. No. 11/342,343, filed Jan. 26, 2006.
U.S. Appl. No. 11/342,297, filed Jan. 26, 2006.
U.S. Appl. No. 11/342,318, filed Jan. 26, 2006.
U.S. Appl. No. 11/342,319, filed Jan. 26, 2006.
U.S. Appl. No. 11/342,320, filed Jan. 26, 2006.
U.S. Appl. No. 11/342,322, filed Jan. 26, 2006.
U.S. Appl. No. 11/342,342, filed Jan. 26, 2006.
U.S. Appl. No. 12/502,158, filed Jul. 13, 2009.
U.S. Appl. No. 11/905,330, filed Sep. 28, 2007.
Non-Final Office Action Summary from U.S. Appl. No. 11/342,322 mailed on Sep. 22, 2010.
Non-Final Office Action Summary from U.S. Appl. No. 11/342,319 mailed on Sep. 13, 2010.

(56) References Cited

OTHER PUBLICATIONS

Final Office Action Summary from U.S. Appl. No. 11/342,342 mailed on Jul. 26, 2010.
Non-Final Office Action Summary from U.S. Appl. No. 11/837,050 mailed on Aug. 18, 2010.
Final Office Action Summary from U.S. Appl. No. 11/342,250 mailed on Sep. 17, 2010.
Final Office Action Summary from U.S. Appl. No. 11/852,948 mailed on May 26, 2010.
Notice of Allowance form U.S. Appl. No. 11/342,318, dated Feb. 23, 2010.
Bowman, W., The Uniform Computer Information Transactions Act: A Well Built Fence or Barbed Wire Around the Intellectual Commons?, LBJ Journal of Public Affairs, Spring 2001, vol. XIII, pp. 80-91, USA; retrieved form http://uts.cc.utexas.edu/~lbjjpa/2001/bowman.pdf on Feb. 16, 2011.
Dean et al., DIMACS Workshop on theft in E-Commerce: Content, Identity, and Service, Apr. 14-15, 2005, pp. 1-7, DIMACS Center, CoRE Building, Rutgers University, Piscataway, NJ, USA; retrieved from http://dimacs.rutgers.edu/Workshops/Intellectual/abstracts.html on Feb. 16, 2011.
International Search Report and Written Opinion from International Application No. PCT/US06/17335, mailed Nov. 29, 2007.
International Preliminary Report on Patentability from International Application No. PCT/US06/17335, dated Nov. 6, 2007.
International Search Report and Written Opinion from International Application No. PCT/US06/17333, mailed Aug. 18, 2008.
International Preliminary Report on Patentability from International Application No. PCT/US2006/017333, dated Mar. 17, 2009.
International Search Report and Written Opinion from International Application No. PCT/US06/17334, mailed Sep. 25, 2007.
International Preliminary Report on Patentability from International Application No. PCT/US2006/017334, dated Nov. 6, 2007.
Response to Non-Final Action dated Apr. 15, 2011 in U.S. Appl. No. 11/342,250 filed on Jul. 15, 2011.
Request for Continued Examination and Amendment in U.S. Appl. No. 11/837,050 filed on Jul. 12, 2011.
Non-Final Office Action in U.S. Appl. No. 11/837,067 mailed on Jun. 23, 2011.
Response to Non-Final Office Action dated Apr. 14, 2011 in U.S. Appl. No. 12/502,158 filed on Jul. 14, 2011.
Response to Final Office Action dated May 15, 2009 in U.S. Appl. No. 11/342,322 filed on Jul. 15, 200.
Non-Final Office Action in U.S. Appl. No. 11/342,322 mailed on Sep. 2, 2011.
Non-Final Office Action in U.S. Appl. No. 11/342,319 mailed on Sep. 7, 2011.
Response to Non-Final Office Action dated Jun. 9, 2011 in U.S. Appl. No. 11/342,343 filed on Sep. 9, 2011.
Finjan SecureBrowsing™,"Browse fearlessly," Finjan, Inc. (1996-2007), 2 pages.
Friendster, Inc. "Welcome to Friendster," www.friendster.com, Copyright 2002-2005, (2 pages).
"How PGP works," copyright 1990-1999 Networks Associates, Inc., available online at http://www.pgpi.org/doc/pgpintro/.
Response to Non-Final Office Action dated Nov. 13, 2007 in U.S. Appl. No. 11/281,963 filed on Feb. 13, 2008.
Request for Continued Examination and Amendment in U.S. Appl. No. 11/281,963 filed on Sep. 17, 2008.
Response to Non-Final Office Action mailed Dec. 2, 2008 in U.S. Appl. No. 11/281,963 filed on Mar. 2, 2009.
Response to Non-Final Office Action dated Jun. 2, 2009 in U.S. Appl. No. 11/281,963 filed on Sep. 2, 2009.
Notice of Appeal in U.S. Appl. No. 11/281,963 filed on Jul. 8, 2010.
Appeal Brief in U.S. Appl. No. 11/281,963 filed on Feb. 8, 2011.
Examiner's Answer to Appellant's Appeal Brief dated Feb. 8, 2011 in U.S. Appl. No. 11/281,963 mailed on Apr. 28, 2011.
Notice of Appeal in U.S. Appl. No. 11/852,948 filed on Oct. 26, 2010.
Appeal Brief in U.S. Appl. No. 11/852,948 filed on Feb. 23, 2011.
Examiner's Answer to Appellant's Feb. 23, 2011 Appeal Brief in U.S. Appl. No. 11/852,948 mailed on May 13, 2011.
Response to Final Office Action dated Dec. 16, 2008 in U.S. Appl. No. 11/342,250 filed on Feb. 17, 2009.
Request for Continued Examination and Amendment in U.S. Appl. No. 11/342,250 filed on Mar. 16, 2009.
Response to Non-Final Office Action dated May 28, 2009 in U.S. Appl. No. 11/342,250 filed on Aug. 28, 2009.
Request for Continued Examination and Amendment in U.S. Appl. No. 11/342,250 filed on Feb. 2, 2010.
Non-Final Office Action in U.S. Appl. No. 11/342,250 mailed on Feb. 26, 2010.
Response to Non-Final Office Action dated Feb. 26, 2010 in U.S. Appl. No. 11/342,250 filed on Jun. 28, 2010.
Request for Continued Examination and Amendment in U.S. Appl. No. 11/342,250 filed on Feb. 17, 2011.
Non-Final Office Action in U.S. Appl. No. 11/342,250 mailed on Apr. 15, 2011.
Response to Non-Final Office Action dated Sep. 2, 2009 in U.S. Appl. No. 11/837,050 filed on Jan. 4, 2010.
Request for Continued Examination and Amendment in U.S. Appl. No. 11/837,050 filed on Jul. 7, 2010.
Response to Non-Final Office Action dated Aug. 18, 2010 in U.S. Appl. No. 11/837,050 filed on Feb. 28, 2011.
Final Office Action in U.S. Appl. No. 11/837,050 mailed on May 12, 2011.
U.S. Appl. No. 11/837,067, filed Aug. 10, 2007.
Response to Non-Final Office Action dated Jun. 17, 2008 in U.S. Appl. No. 11/837,067 filed on Sep. 17, 2008.
Request for Continued Examination and Amendment in U.S. Appl. No. 11/837,067 filed on Mar. 30, 2009.
Response to Non-Final Office Action dated Jun. 12, 2009 in U.S. Appl. No. 11/837,067 filed on Nov. 12, 2009.
Request for Continued Examination and Amendment in U.S. Appl. No. 11/837,067 filed on Jun. 1, 2010.
Response to Non-Final Office Action dated Jul. 12, 2010 in U.S. Appl. No. 11/837,067 filed on Jan. 12, 2011.
Final Office Action in U.S. Appl. No. 11/837,067 mailed on Apr. 1, 2011.
Request for Continued Examination and Amendment in U.S. Appl. No. 11/837,067 filed on Jun. 1, 2011.
Response to Non-Final Office Action dated May 5, 2008 in U.S. Appl. No. 11/342,320 filed on Sep. 5, 2008.
Response to Final Office Action dated Dec. 11, 2008 in U.S. Appl. No. 11/342,320 filed on Feb. 11, 2009.
312 Amendment in U.S. Appl. No. 11/342,320 filed on Jun. 4, 2009.
Non-Final Office Action in U.S. Appl. No. 12/502,158 mailed on Apr. 14, 2011.
Response to Non-Final Office Action dated Mar. 27, 2008 in U.S. Appl. No. 11/342,318 filed on May 22, 2008.
Pre-Brief Conference Request and Notice of Appeal in U.S. Appl. No. 11/342,318 filed on Nov. 18, 2008.
Pre-Brief Conference Decision in U.S. Appl. No. 11/342,318 mailed on Dec. 11, 2008.
Request for Continued Examination and Amendment in U.S. Appl. No. 11/342,318 filed on Feb. 18, 2009.
Response to Non-Final Office Action dated Mar. 26, 2009 in U.S. Appl. No. 11/342,318 filed on Jun. 26, 2009.
Request for Continued Examination and Amendment in U.S. Appl. No. 11/342,318 filed on Jan. 21, 2010.
Response to Non-Final Office Action dated Jan. 24, 2008 in U.S. Appl. No. 11/342,342 filed on Apr. 10, 2008.
Response to Final Office Action dated Jul. 22, 2008 in U.S. Appl. No. 11/342,342 filed on Sep. 17, 2008.
Request for Continued Examination and Amendment in U.S. Appl. No. 11/342,342 filed on Nov. 24, 2008.
Response to Non-Final Office Action dated Jan. 23, 2009 in U.S. Appl. No. 11/342,342 filed on May 26, 2009.
Request for Continued Examination and Amendment in U.S. Appl. No. 11/34,342 filed on Dec. 21, 2009.
Response to Non-Final Office Action dated Jan. 12, 2010 in U.S. Appl. No. 11/342,342 filed on May 12, 2010.

(56) References Cited

OTHER PUBLICATIONS

Request for Continued Examination and Amendment in U.S. Appl. No. 11/342,342 filed on Jan. 26, 2011.
Response to Non-Final Office Action dated Sep. 18, 2008 in U.S. Appl. No. 11/342,322 filed on Dec. 18, 2008.
Notice to Applicant regarding Non-Compliant Amendment in U.S. Appl. No. 11/342,322 mailed on Jan. 16, 2009.
Response to Notice dated Jan. 16, 2009 in U.S. Appl. No. 11/342,322 filed on Feb. 17, 2009.
Response to Final Office Action dated May 15, 2009 in U.S. Appl. No. 11/342,322 filed on Jul. 15, 2009.
Request for Continued Examination and Amendment in U.S. Appl. No. 11/342,322 filed on Aug. 12, 2009.
Response to Non-Final Office Action dated Oct. 16, 2009 in U.S. Appl. No. 11/342,322 filed on Jan. 19, 2010.
Request for Continued Examination and Amendment in U.S. Appl. No. 11/342,322 filed on Jun. 1, 2010.
Response to Non-Final Office Action dated Sep. 22, 2010 in U.S. Appl. No. 11/342,322 filed on Feb. 22, 2011.
Final Office Action in U.S. Appl. No. 11/342,322 mailed on Mar. 21, 2011.
Request for Continued Examination and Amendment in U.S. Appl. No. 11/342,322 filed on May 23, 2011.
Response to Non-Final Office Action dated Jul. 9, 2008 in U.S. Appl. No. 11/342,297 filed on Dec. 9, 2008.
Notice of Appeal in U.S. Appl. No. 11/342,297 filed on Jun. 17, 2009.
Request for Continued Examination and Amendment in U.S. Appl. No. 11/342,297 filed on Nov. 17, 2009.
Response to Non-Final Office Action dated Dec. 28, 2009 in U.S. Appl. No. 11/342,297 filed on Apr. 28, 2010.
Non-Final Office Action in U.S. Appl. No. 11/342,297 mailed on Sep. 24, 2010.
Response to Non-Final Office Action dated Sep. 17, 2008 in U.S. Appl. No. 11/342,319 filed on Dec. 17, 2008.
Request for Continued Examination and Amendment in U.S. Appl. No. 11/342,319 filed on Jun. 16, 2009.
Response to Non-Final Office Action dated Aug. 25, 2009 in U.S. Appl. No. 11/342,319 filed on Dec. 28, 2009.
Response to Final Office Action dated Jan. 22, 2010 in U.S. Appl. No. 11/342,319 filed on Mar. 22, 2010.
Request for Continued Examination and Amendment in U.S. Appl. No. 11/342,319 filed on Apr. 22, 2010.
Notice of Appeal in U.S. Appl. No. 11/342,319 filed on Feb. 23, 2011.
Request for Continued Examination and Amendment in U.S. Appl. No. 11/342,319 filed on Apr. 25, 2011.
Response to Non-Final Office Action dated Jan. 13, 2010 in U.S. Appl. No. 11/342,343 filed on May 13, 2010.
Notice to Applicant regarding Non-Responsive/Non-Compliant Amendment in U.S. Appl. No. 11/342,343 mailed on May 19, 2010.
Response to Notice dated May 19, 2010 filed in U.S. Appl. No. 11/342,343 filed on Jun. 11, 2010.
Non-Final Office Action in U.S. Appl. No. 11/342,343 mailed on Jun. 9, 2011.
Response to Non-Final Office Action dated Dec. 30, 2009 in U.S. Appl. No. 11/905,330, filed Mar. 30, 2010.
Request for Continued Examination and Amendment in U.S. Appl. No. 11/342,250 filed on Nov. 30, 2012.
Notice of Allowance in U.S. Appl. No. 11/837,050 mailed on Nov. 27, 2012.
Response to Non-Final Office Action dated Jul. 24, 2012 in U.S. Appl. No. 11/342,322 filed on Oct. 24, 2012.
Response to Non-Final Office Action dated Jul. 24, 2012 in U.S. Appl. No. 11/342,319 filed on Oct. 24, 2012.
Request for Continued Examination and Amendment in U.S. Appl. No. 11/342,250 filed on Feb. 8, 2012.
Non-Final Office Action in U.S. Appl. No. 11/342,250 mailed on Feb. 23, 2012.
Response to Non-Final Office Action dated Nov. 25, 2011 in U.S. Appl. No. 11/837,050 filed on Feb. 24, 2012.
Final Office Action in U.S. Appl. No. 11/837,050 mailed on Mar. 19, 2012.
Request for Continued Examination and Amendment in U.S. Appl. No. 11/837,067 filed on Jan. 17, 2012.
Notice of Allowance in U.S. Appl. No. 11/837,067 mailed on Mar. 7, 2012.
Request for Continued Examination in U.S. Appl. No. 11/837,067 filed on Mar. 23, 2012.
U.S. Appl. No. 13/431,873, filed Mar. 27, 2012, entitled System Method, and Computer Program Product for Presenting an Indicia of Risk Associated with Search Results within a Graphical User Interface, Inventors, Christopher John Dixon et al.
Response to Non-Final Office Action dated Nov. 28, 2011 in U.S. Appl. No. 12/502,158 filed on Feb. 27, 2012.
Response to Non-Final Office Action dated Sep. 22, 2011 in U.S. Appl. No. 11/342,342 filed on Dec. 22, 2011.
Non-Final Office Action in U.S. Appl. No. 11/342,342 mailed on Mar. 2, 2012.
Final Office Action in U.S. Appl. No. 11/342,322 mailed on Jan. 26, 2012.
Request for Continued Examination and Amendment in U.S. Appl. No. 11/342,322 filed on Mar. 26, 2012.
Response to Non-Final Office Action dated Sep. 7, 2011 in U.S. Appl. No. 11/342,319 filed on Dec. 7, 2011.
Final Office Action in U.S. Appl. No. 11/342,319 mailed on Jan. 25, 2012.
Request for Continued Examination and Amendment in U.S. Appl. No. 11/342,319 filed on Mar. 26, 2012.
Response to Non-Final Office Action dated Feb. 23, 2012 in U.S. Appl. No. 11/342,250 filed on May 14, 2012.
Final Office Action in U.S. Appl. No. 11/342,250 mailed on Aug. 30, 2012.
Request for Continued Examination and Amendment in U.S. Appl. No. 11/837,050 filed on May 10, 2012.
Notice of Allowance in U.S. Appl. No. 11/837,050 mailed on Jun. 6, 2012.
Request for Continued Examination in U.S. Appl. No. 11/837,050 filed on Sep. 6, 2012.
U.S. Appl. No. 13/568,085, filed Aug. 6, 2012 and entitled "System, Method, and Computer Program Product for Presenting an Indica of Risk Reflecting an Analysis Associated with Search Results within a Graphical User Interface," Christopher John Dixon et al. inventors.
Notice of Allowance in U.S. Appl. No. 11/837,067 mailed on Jun. 22, 2012.
Notice of Allowance in U.S. Appl. No. 12/502,158 mailed on May 30, 2012.
Request for Continued Examination in U.S. Appl. No. 12/502,158 filed on Aug. 30, 2012.
Notice of Allowance in U.S. Appl. No. 12/502,158 mailed on Oct. 9, 2012.
U.S. Appl. No. 13/621,037, filed Sep. 15, 2012 entitled "Indicating Website Reputations during Website Manipulation of User Information", Inventors Christopher John Dixon et al.
Response to Non-Final Office Action dated Mar. 2, 2012 in U.S. Appl. No. 11/342,342 filed on Jun. 4, 2012.
Final Office Action in U.S. Appl. No. 11/342,342 mailed on Jul. 2, 2012.
Request for Continued Examination and Amendment in U.S. Appl. No. 11/342,342 filed on Oct. 2, 2012.
Non-Final Office Action in U.S. Appl. No. 11/342,322 mailed on Jul. 24, 2012.
Non-Final Office Action in U.S. Appl. No. 11/342,319 mailed on Jul. 24, 2012.
Final Office Action in U.S. Appl. No. 11/342,250 mailed on Nov. 8, 2011.
Non-Final Office Action in U.S. Appl. No. 11/837,050 mailed on Nov. 25, 2011.
Response to Non-Final Office Action dated Jun. 23, 2011 in U.S. Appl. No. 11/837,067 filed on Sep. 23, 2011.
Final Office Action in U.S. Appl. No. 11/837,067 mailed on Nov. 17, 2011.
Notice of Allowance in U.S. Appl. No. 12/502,158 mailed on Sep. 27, 2011.

(56) References Cited

OTHER PUBLICATIONS

Request for Continued Examination in U.S. Appl. No. 12/502,158 filed on Nov. 7, 2011.
Non-Final Office Action in U.S. Appl. No. 12/502,158 mailed on Nov. 28, 2011.
Non-Final Office Action in U.S. Appl. No. 11/342,342 mailed on Sep. 22, 2011.
Response to Sep. 2, 2011 Non-Final Office Action in U.S. Appl. No. 11/342,322 filed on Dec. 1, 2011.
Request for Continued Examination and Amendment in U.S. Appl. No. 11/342,343 filed on Jan. 14, 2011.
Final Office Action in U.S. Appl. No. 11/342,343 mailed on Sep. 26, 2011.
Request for Continued Examination and Amendment in U.S. Appl. No. 11/342,343 filed on Nov. 28, 2011.
Examiner Interview Summary in U.S. Appl. No. 11/342,343 mailed on Dec. 5, 2011.
Final Office Action in U.S. Appl. No. 11/342,319 mailed on Jan. 4, 2013.
Issue Notification in U.S. Appl. No. 11/837,050 mailed Apr. 3, 2013—Patent No. 8429545.
Non-Final Office Action in U.S. Appl. No. 13/621,037 mailed Dec. 31, 2012.
Notice of Publication in U.S. Appl. No. 13/621,037.
Notice of Allowance in U.S. Appl. No. 11/342,250 mailed on Jan. 10, 2013.
Final Office Action in U.S. Appl. No. 11/342,322 mailed on Jan. 4, 2013.

\* cited by examiner

SYSTEM, METHOD AND COMPUTER PROGRAM PRODUCT FOR OBTAINING A REPUTATION ASSOCIATED WITH A FILE

FIELD OF THE INVENTION

The present invention relates to security applications, and more particularly to reputation rating systems.

BACKGROUND

Increasingly, computer systems have needed to protect themselves against undesirable code. Such undesirable computer code has generally taken the form of viruses, worms, Trojan horses, spyware, adware, and so forth. The damage and/or inconvenience capable of being incurred by these types of undesirable code has ranged from mild interference with a program, such as the display of an unwanted political message in a dialog box, to the complete destruction of contents on a hard drive, and even the theft of personal information.

Many mechanisms have been created in order to provide the much needed protection from such undesirable code and the affects thereof. For example, prior art systems are capable of identifying a "reputation" of a web site. This is traditionally accomplished by reviewing various files that are available from the site. If such files are determined to be free of malware, spyware, etc., the foregoing systems assume that the entity providing such content is "good" and can perhaps be trusted in other areas such as data accuracy, authenticity, etc. On the other hand, however, if the available files are determined to contain undesirable code that proves to be harmful or otherwise hinder normal computer operation, etc., the entity and associated site providing such files can be assumed to be "bad."

Unfortunately, such prior art systems only provide the "reputation" of web sites, as opposed to individual files. Thus, the "good" or "bad" rating of files associated with a given on-line site is typically done manually by a computer user. For example, such user may either hear that a new music download site has files infected with spyware and, as a result, the user will not download such files. In more serious situations, such person may empirically learn of the "bad" nature of the files by personally downloading one or more of the files and becoming infected, a truly undesirable situation.

There is thus a need for overcoming these and/or other problems associated with the prior art.

SUMMARY

A reputation system, method and computer program product are provided. In use, a file associated with a first computer is identified. Thereafter, a reputation associated with the file stored at a second computer is obtained.

DETAILED DESCRIPTION

Figure 1:
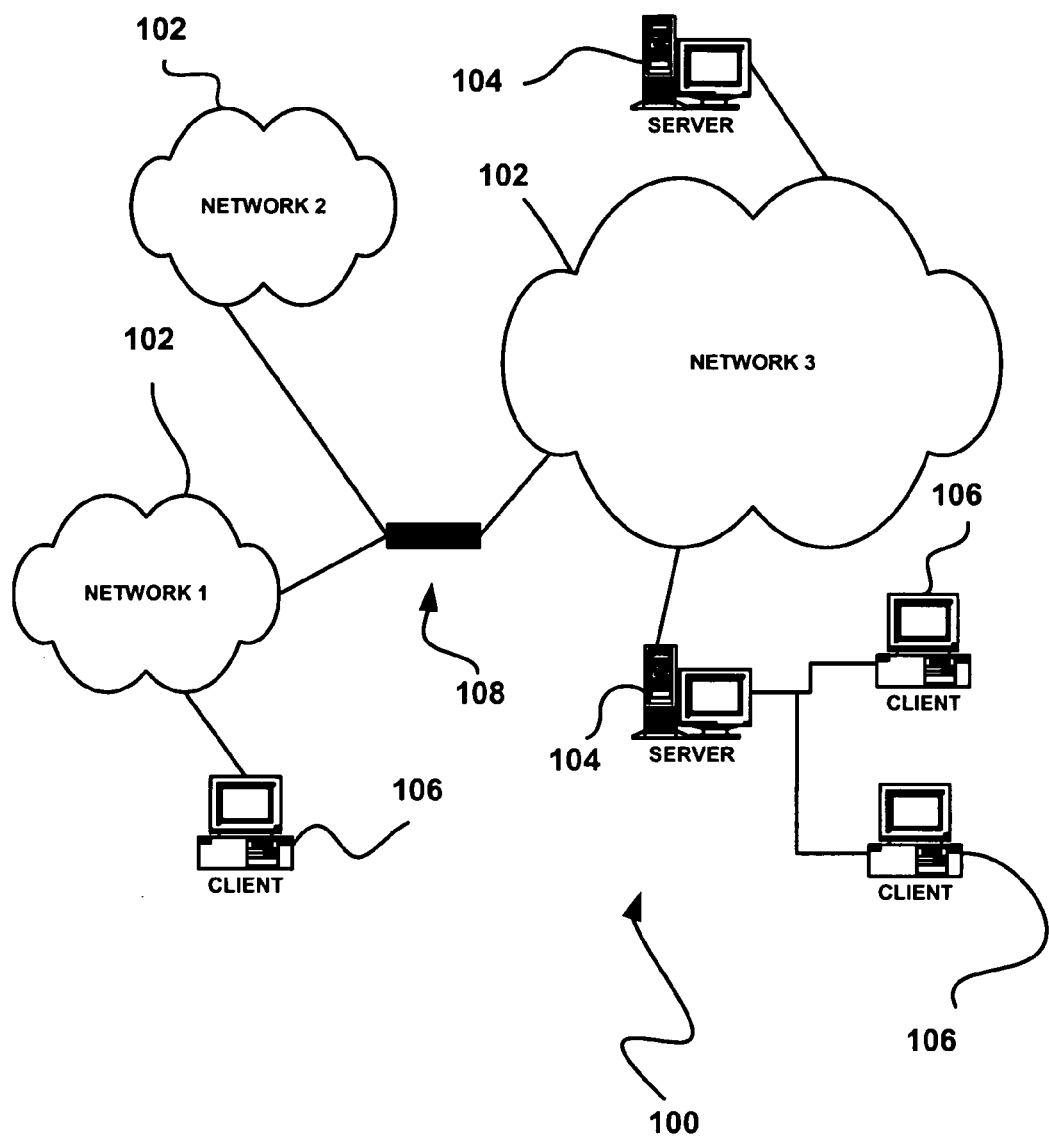
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are server computers 104 which are capable of communicating over the networks 102. Also coupled to the networks 102 and the server computers 104 is a plurality of client computers 106. Such server computers 104 and/or client computers 106 may each include a desktop computer, lap-top computer, hand-held computer, mobile phone, hand-held computer, peripheral (e.g. printer, etc.), any component of a computer, and/or any other type of logic. In order to facilitate communication among the networks 102, at least one gateway 108 is optionally coupled therebetween.

Figure 2:
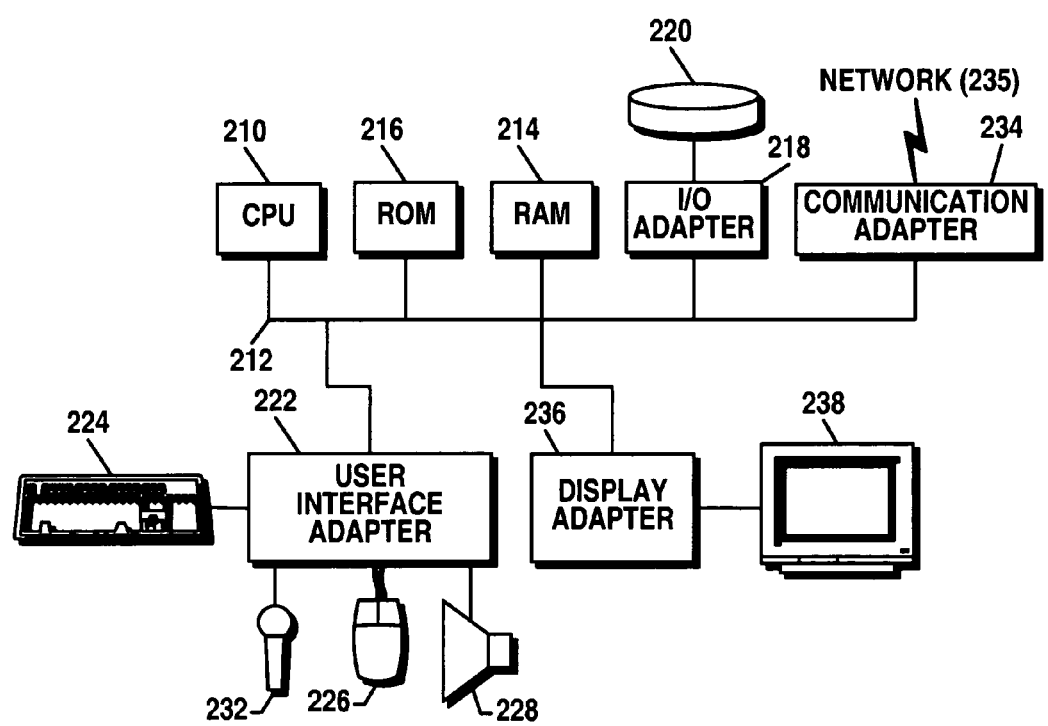
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
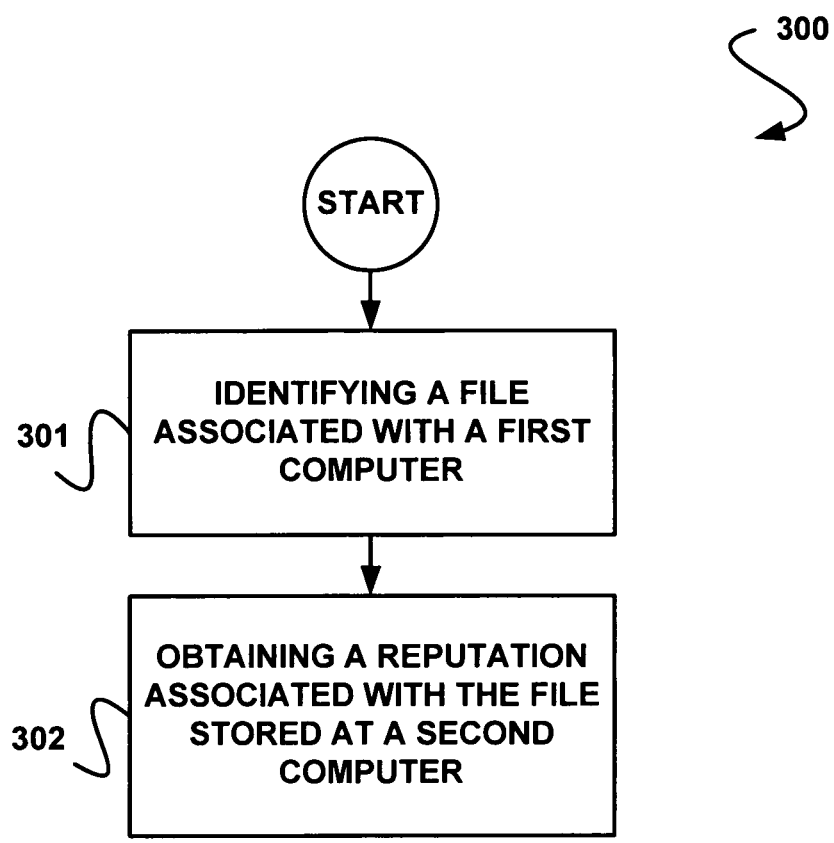
FIG. 3 shows a method for obtaining a reputation associated with a file, in accordance with one embodiment.

FIG. 3 shows a method 300 for obtaining a reputation associated with a file, in accordance with one embodiment. As an option, the method 300 may be implemented in the context of the architecture and environment of FIGS. 1 and/or 2. Of course, however, the method 300 may be carried out in any desired environment.

As shown, in operation 301, a file associated with a first computer is identified. In the context of the present description, a file may refer to a text file, a word processing file, a spreadsheet file, a picture file, an executable file, a script file, a library file, a control file, a component of a file, and/or any other collection of data and/or code capable of having a reputation as will soon be set forth. Still yet, the first computer may refer to a client or server computer (e.g. see, for example, computers 102 and 104 of FIG. 1, etc.), and/or any desired device. Even still, the aforementioned association between the file and computer may refer to the fact that the file is stored in memory of the computer, the file is controlled/managed by the computer, and/or any other desired association.

Of course, the file may be identified in any desired manner. Just by way of example, the file may be identified upon being selected for downloading and/or opening (e.g. during the course of an on-access scan, etc.), during the course of an on-demand scan, and/or by any other technique that results in the identification of the file.

To this end, a reputation associated with the file stored at a second computer may be obtained. See operation 302. Similar to the first computer, the second computer may refer to a client or server computer (e.g. see, for example, computers 102 and 104 of FIG. 1, etc.), and/or any desired device, as long as the second computer is separate from the first computer. In the context of the present description, the term reputation may refer to any information relating to any characteristic or trait associated with the file. More information regarding one exemplary way the reputation may be obtained in the spirit of the present embodiment will be set forth during reference to FIG. 5.

In one optional embodiment, the reputation may be obtained utilizing a database identifying a plurality of files and a reputation associated with each of the files. Of course, such database may be situated on any desired computer (e.g. the aforementioned second computer, etc.). In another embodiment, the reputation may even be obtained from a computer that is the same as that associated with the file. Thus, during use, the database is accessible by a computer attempting to download the file, and/or otherwise identifies the same.

Of course, the database may be generated in any desired manual and/or automated manner. Just by way of example, an Internet-crawling technique may be employed. Still yet, in other embodiments, each file may first be identified at a particular computer during the use thereof, such that a reputation associated with the file may be determined and stored at another computer. More information regarding such ways of building a reputation database will be set forth during reference to FIGS. 4 and 6.

Again, more illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
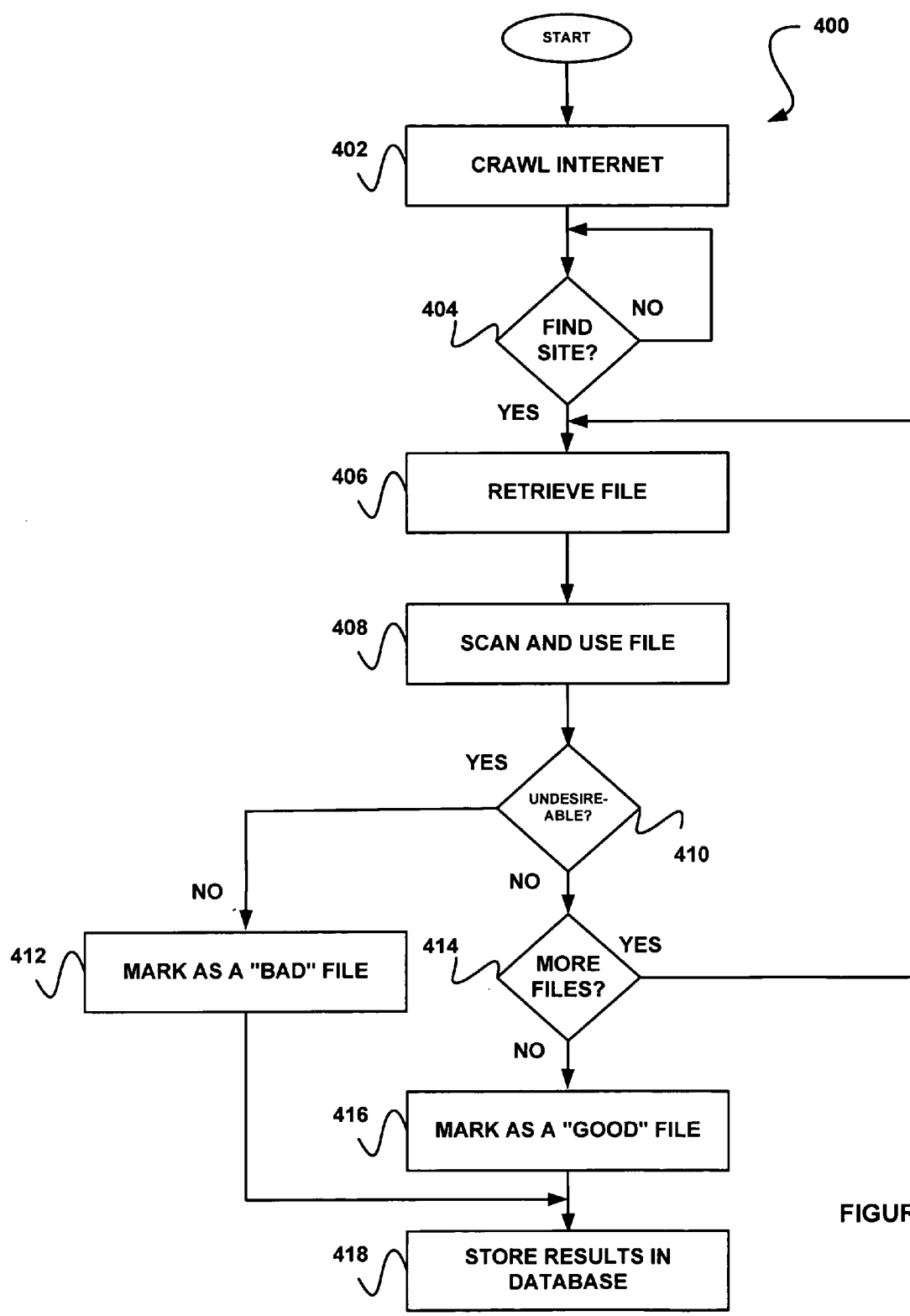
FIG. 4 shows a method for generating a reputation database in an automated manner, in accordance with one embodiment.

FIG. 4 shows a method 400 for generating a reputation database in an automated manner, in accordance with one embodiment. As an option, the method 400 may be implemented in the context of the architecture and environment of FIGS. 1-2. Of course, however, the method 400 may be carried out in any desired environment. It should also be noted that the aforementioned definitions may apply during the present description.

As shown, in operation 402, a network (e.g. the Internet, etc.) may be crawled in the search of sites (e.g. web sites, etc.) with files stored in associated therewith. Of course, this may be accomplished in any desired manner. Just by way of example, one or more search agents may search the network for different sites and process the same in the following manner. To this end, a plurality of files associated with a plurality of sites on a network are inspected.

Specifically, in decision 404, it is first determined whether a site is found. If so, a file stored at the site is retrieved. See operation 406. Such retrieval may be effected by downloading the file to a computer (e.g. see, for example, computers 102 and 104 of FIG. 1, etc.) other than that on which the site resides, for the purpose of executing the following operations. Of course, other embodiments are contemplated whereby such downloading is not necessary and the following operations are performed at the site.

With continuing reference to FIG. 4, such processing includes the scanning and/or use of the file, as set forth in operation 408. The present scanning may involve the comparison of the file with a plurality of signatures, patterns, etc. that are known to be associated with at least potentially undesirable characteristics. Of course, such undesirable characteristics may be indicative of any at least potentially undesirable code including, but not limited to malware (e.g. viruses, worms, Trojan horses, etc.) spyware, adware, spam, etc. Of course, any other processing may be employed that is capable of identifying at least one undesirable characteristic associated with the file (if it exists).

In addition to or instead of the aforementioned scanning, the file may also be used to determine whether any undesirable characteristic is exhibited. Such use may take the form of simply opening the file, executing the file in an isolated environment, and/or any other type of use that is capable of prompting the file to exhibit an undesirable characteristic (again, if it exists).

It should be strongly noted that additional techniques may be employed other than the above scanning and use. Just by way of example, any type of emulation, heuristics, loading, etc. may be employed. Still yet, other techniques may be utilized as a function of a type of the file. For example, in the case of a compressed file (e.g. a file in a ZIP format, etc.), the file may first be decompressed, etc.

To this end, it may be determined in decision 410 as to whether any undesirable characteristics are exhibited. If so, the file may be identified as having at least a potentially "bad" reputation. On the other hand, if it is determined in decision 410 that undesirable characteristics are not exhibited in association with an instant file, it may be determined in decision 414 as to whether any additional files exist with respect to the current site.

If it is determined in decision 414 that at least one additional file exists with respect to the current site, the operations 406-410 may be repeated, as necessary. To this end, if each of the files are scanned and/or used, and no undesirable characteristics are exhibited per decision 410, each file (and potentially the entire site) may be identified as having at least a potentially "good" reputation. Conversely, if at least one of the files associated with the site is determined to have the bad reputation, at least the file exhibiting the undesirable characteristic (and/or all of the files of the site) may be designated with such negative reputation. Thus, in one embodiment (shown in FIG. 4), the existence of at least one bad file may result in the entire site (and associated files) as having a bad reputation. Of course, however, in other embodiments, each file may be individually given a good or bad reputation.

Next, in operation 418, results of the foregoing operations may be stored in a database. In one embodiment, such database may include a remote central database which may or may not be distributed among a plurality of servers, etc. Of course, other embodiments are envisioned where the database is stored locally.

Of course, the identification of the appropriate reputation may be implemented in any desired manner. Just by way of example, Table 1 illustrates one exemplary data structure that may be used in association with the foregoing database.

TABLE 1

| File name_1 | Good_Reputation |
| File name_2 | Bad_Reputation |
| File name_3 | Good_Reputation |
| File name_4 | Bad_Reputation |
| File name_5 | Good_Reputation |

Such data structure, of course, should not be construed as limiting in any manner. For example, more than two possible reputations may be contemplated, thereby providing more granularity as to file reputation. Further, the files may be identified using additional file-related information including, but not limited to a time stamp, file size, hash (e.g. checksum, etc.), and/or any other desired file attribute.

With the foregoing database populated, the database may be used in a situation where the file is subsequently opened and/or used, for enhancing security. More information will now be set forth regarding one exemplary method of use of the database in such manner.

Figure 5:
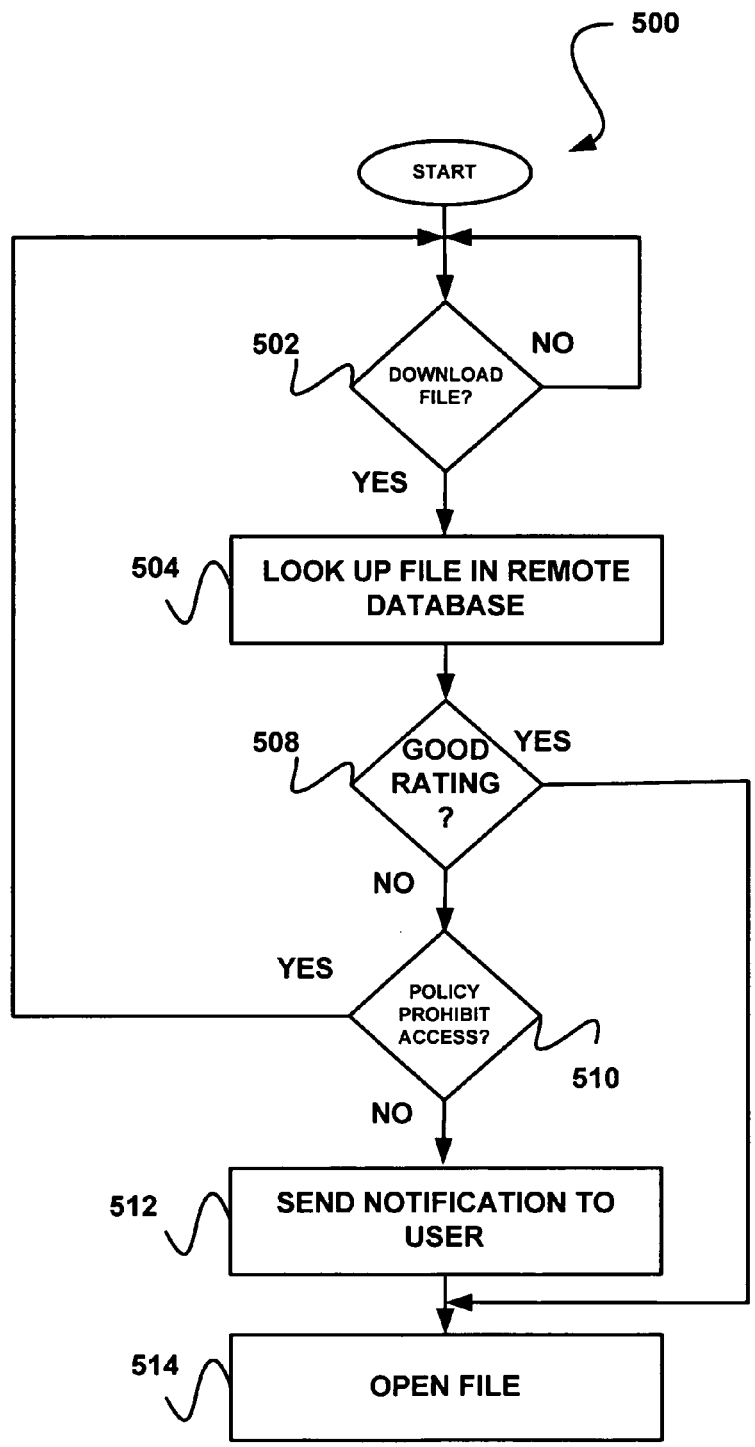
FIG. 5 shows a method for using a reputation database, in accordance with one embodiment.

FIG. 5 shows a method 500 for using a reputation database, in accordance with one embodiment. As an option, the method 500 may be implemented in the context of the architecture and environment of FIGS. 1-4. Of course, however, the method 500 may be carried out in any desired environment. Again, the aforementioned definitions may equally apply during the present description.

As shown, it is determined, in decision 502, whether a file is to be (or has been) downloaded over a network. While a downloading scenario is described herein, it should be noted that the file may be identified in response to any attempt to obtain, open, use, execute, etc. the file. As shown, in decision 502, the method 500 polls until such identification is made.

Upon it being determined that a file is to be (or has been) downloaded over the network, per decision 502, the file is looked up in a remote database. See operation 504. Such remote database may, in one embodiment, take the form of that set forth during reference to Table 1 above, and may further be generated in accordance with FIG. 4. To accomplish the functionality of the present method 500, an agent may be loaded onto each computer on which protection is desired, where such agent is capable of the present operations as is further equipped with the location of the remote database.

Once the look-up is complete, it may be determined whether the file has a good or bad rating. See decision 508. If the file has a good rating, the file may simply be opened by the user without further intervention. Note operation 514. Of course, the file may optionally be subjected to supplementary scanning, etc. prior to opening in operation 514.

On the other hand, if it is determined, in decision 508, that the file has a bad rating, it may then be determined whether a policy associated with the computer, network, and/or user downloading the file is prohibited from accessing files with such bad reputation. See operation 510. If so, the method 500 may be restarted without opening the file. In various embodiments, the policy may be set by an administrator and/or be user-configurable per the desires of the user.

If, in contrast, the policy does not necessarily prohibit access to files with a bad reputation, the user may be simply notified of the reputation. See operation 512. To this end, the user may make a manual determination as to whether the file is safe to open. In addition to or instead of such notification, additional scanning, etc. may be carried out, for security purposes. Of course, any desired response (or lack thereof) may be employed as function of both the policy and the bad or good reputation.

By this design, in one example of use, a may user observe, through a rating display interface or the like, that the file being downloaded may have previously done harm to another computer, in which case the user may wish to abort or clean the file before use and/or execution. Still yet, upon determining such condition, the user may be inhibited from completing or using the download via the aforementioned policy, thus providing a way for an enterprise to protect employees with policy-based actions, etc.

Alternatively, when a good rating is found, the user may be able to proceed in downloading, opening, saving, running, etc. the file. In summary, in the case of a good rating, the user may feel safer using the referenced file; and, in the case of a bad rating, the user may be discouraged or even inhibited from using the referenced file.

Figure 6:
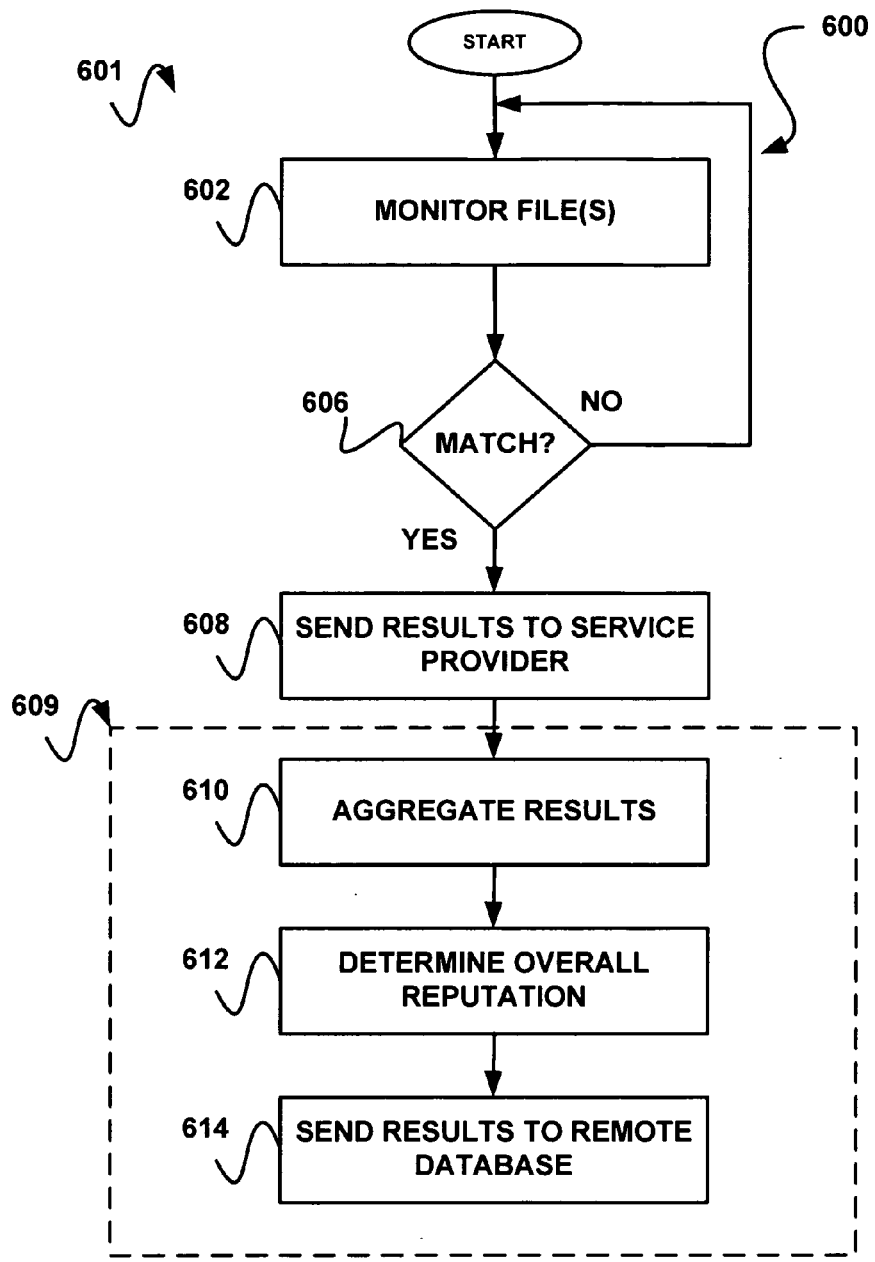
FIG. 6 shows a method for generating a reputation database in a distributed manner, in accordance with another embodiment.

FIG. 6 shows a method 600 for generating a reputation database in a distributed manner, in accordance with one embodiment. As an option, the method 600 may be implemented in the context of the architecture and environment of FIGS. 1-5 and, in particular, be used instead of or in conjunction with the method 400 of FIG. 4, for building a reputation database. Of course, however, the method 600 may be carried out in any desired environment. Yet again, the aforementioned definitions may equally apply during the present description.

As shown, an initial set of operations 601 may each be carried out utilizing an agent loaded onto a computer where one or more files are being accessed, used, etc. While only one set of operations 601 is shown in FIG. 6, it should be noted that such set of operations 601 may be carried out on a plurality of separate computers. To this end, such set of computers may feed a service provider which, in turn, processes results of such sets of operations 601 during the course of a subsequent set of operations 609, in a manner that will soon be set forth.

In particular, one or more files are monitored at the one or more computers. Note operation 602. It should be noted that such monitoring may refer to any of the aforementioned processing (e.g. see, for example, operation 408 of FIG. 4, etc.) that is capable of identifying undesirable characteristics. See decision 606.

If, at any time, any undesirable characteristics are found in association with any one or more files, information relating to such processing may be sent to a service provider. Note operation 608. In one embodiment, such service provider may include MCAFEE, INC. Further, it should be noted that the information may include an identification of the file along with the undesirable characteristics and/or a determination as to whether the file has a good or bad reputation, etc. (depending on where such determination is to take place).

Thus, in operation 610, the service provider may receive such information from a plurality of different computers for aggregation purposes. By aggregating the information, such information may be compared and/or correlated in order to provide a more certain determination regarding the reputation thereof. See operation 612. Thus, such overall reputation may, in turn, be sent to a remote database. Of course, the computer (e.g. server, etc.) on which the service provider operates may or may not be that on which the database resides.

Thus, in one example of use, a "community rating system" may be provided to augment or replace the aforementioned automatic download-and-detect method described during reference to FIG. 4. Here, in one embodiment, a software agent running on a computer may indicate a user experience with a downloaded file; if the downloaded file eventually demonstrates undesirable characteristics (e.g. found through experience to contain harmful malware of any type, etc.). In such case, the user is able to automatically or manually submit such findings in a controlled manner to a central service provider and a related network reputation database, thus providing additional indicators that are used to ultimately determine the rating of a given file.

In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by sub-national groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems. Thus, by optionally incorporating the present technology into the cyber-frameworks of the foregoing potential targets, terrorism may be countered by identifying code as including malware, etc., which may be used to combat cyber-terrorism.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
   identifying a file associated with a first computer;
   obtaining an overall reputation associated with the file stored at a second computer, wherein the overall reputation comprises at least one characteristic associated with the file that includes undesirable code identified through a scanning activity, and wherein the overall reputation is determined by receiving information on the reputation of the file from each of a plurality of computers and aggregating the information received from each of the plurality of computers to produce the overall reputation associated with the file, and wherein the information on the reputation of the file received from each of the plurality of computers is based upon a respective determination of a reputation of the file by each of the plurality of computers; and
   identifying a policy, wherein an agent provisioned in the first computer prohibits downloading of the file based on whether the reputation complies with configurable reputation settings provided in the policy, and wherein the policy is configured for indicating that additional scanning is to be carried out based on the reputation of the file.

2. The method of claim 1, wherein the overall reputation associated with the file is determined automatically by inspecting a plurality of files associated with a plurality of sites on a network.

3. The method of claim 2, wherein a plurality of the reputations associated with the plurality of files are stored in a database at the second computer, from which the overall reputation is obtained.

4. The method of claim 1, wherein the overall reputation associated with the file is determined based on an identification of an undesirable characteristic during at least one of scanning and using the file.

5. The method of claim 1, wherein information on the overall reputation associated with the file is identified at a third computer during use of the file.

6. The method of claim 1, wherein the overall reputation is obtained by looking up the overall reputation in a central database.

7. A non-transitory computer-readable medium, comprising one or more instructions that when executed on a processor configure the processor to:
   identify a file associated with a first computer;
   obtain an overall reputation associated with the file stored at a second computer, wherein the overall reputation comprises at least one characteristic associated with the file that includes undesirable code identified through a scanning activity, and wherein the overall reputation is determined by receiving information on the reputation of the file from each of a plurality of computers and aggregating the information received from each of the plurality of computers to produce the overall reputation associated with the file, and wherein the information on the reputation of the file received from each of the plurality of computers is based upon a respective determination of a reputation of the file by each of the plurality of computers; and
   identify a policy, wherein an agent provisioned in the first computer prohibits downloading of the file based on whether the reputation complies with configurable reputation settings provided in the policy, and wherein the policy is configured for indicating that additional scanning is to be carried out based on the reputation of the file.

8. The computer-readable medium of claim 7, wherein the reputation includes at least one of a good reputation and a bad reputation.

9. The computer-readable medium of claim 8, wherein the policy is set by an administrator and indicates that the access to the file with the bad reputation is prohibited based on the policy.

10. The computer-readable medium of claim 7, wherein the policy further indicates that the file should be executed in an isolated environment to determine if any undesirable characteristic is exhibited by the file.

11. The computer-readable medium of claim 7, wherein the policy further indicates that the file should be emulated to determine if any undesirable characteristic is exhibited by the file.

12. The computer-readable medium of claim 7, wherein the overall reputation associated with the file is determined automatically by inspecting a plurality of files associated with a plurality of sites on a network.

13. The computer-readable medium of claim 12, wherein a plurality of the reputations associated with the plurality of files are stored in a database at the second computer, from which the overall reputation is obtained.

14. The computer-readable medium of claim 7, wherein the overall reputation associated with the file is determined based on an identification of an undesirable characteristic during at least one of scanning and using the file.

15. The computer-readable medium of claim 7, wherein information on the overall reputation associated with the file is identified at a third computer during use of the file.

16. The computer-readable medium of claim 7, wherein the file is identified in response to an attempt to download the file over a network.

17. The computer-readable medium of claim 7, wherein the overall reputation is obtained by looking up the overall reputation in a central database.

18. An apparatus, comprising:
  a processor operable to execute computer program instructions; and
  a memory coupled to the processor and operable to store computer program instructions executable by the processor such that the system is configured to:
  identify a file associated with a first computer;
  obtain an overall reputation associated with the file stored at a second computer, wherein the overall reputation comprises at least one characteristic associated with the file that includes undesirable code identified through a scanning activity, and wherein the overall reputation is determined by receiving information on the reputation of the file from each of a plurality of computers and aggregating the information received from each of the plurality of computers to produce the overall reputation associated with the file, and wherein the information on the reputation of the file received from each of the plurality of computers is based upon a respective determination of a reputation of the file by each of the plurality of computers; and
  identify a policy, wherein an agent provisioned in the first computer prohibits downloading of the file based on whether the reputation complies with configurable reputation settings provided in the policy, and wherein the policy is configured for indicating that additional scanning is to be carried out based on the reputation of the file.

19. The apparatus of claim 18, wherein the overall reputation associated with the file is determined automatically by inspecting a plurality of files associated with a plurality of sites on a network.

20. The apparatus of claim 19, wherein a plurality of the reputations associated with the plurality of files are stored in a database at the second computer, from which the overall reputation is obtained.

21. The apparatus of claim 18, wherein the overall reputation associated with the file is determined based on an identification of an undesirable characteristic during at least one of scanning and using the file.

22. A system, comprising:
  a first computer configured to identify a file associated with the first computer; and
  a second computer configured to provide an overall reputation associated with the file stored at the second computer to the first computer, wherein the overall reputation comprises at least one characteristic associated with the file that includes undesirable code identified through a scanning activity, and wherein the overall reputation is determined by receiving information on the reputation of the file from each of a plurality of computers and aggregating the information received from each of the plurality of computers to produce the overall reputation associated with the file, and wherein the information on the reputation of the file received from each of the plurality of computers is based upon a respective determination of a reputation of the file by each of the plurality of computers; and
  wherein the first computer is further configured to identify a policy, wherein an agent provisioned in the first computer prohibits downloading of the file based on whether the reputation complies with configurable reputation settings provided in the policy, and wherein the policy is configured for indicating that additional scanning is to be carried out based on the reputation of the file.

23. The system of claim 22, wherein the overall reputation associated with the file is determined automatically by inspecting a plurality of files associated with a plurality of sites on a network.

24. The system of claim 23, wherein a plurality of the reputations associated with the plurality of files are stored in a database at the second computer, from which the overall reputation is obtained.

25. The system of claim 22, wherein the overall reputation associated with the file is determined based on an identification of an undesirable characteristic during at least one of scanning and using the file.

* * * * *